Dec. 5, 1933.  R. H. STEARNS  1,937,991

PIPE CONVEYER ROLL

Filed April 14, 1930

Inventor
Roswell H. Stearns
By Wheeler, Wheeler & Wheeler
Attorneys

Patented Dec. 5, 1933

1,937,991

UNITED STATES PATENT OFFICE 1,937,991

PIPE CONVEYER ROLL

Roswell H. Stearns, Milwaukee, Wis., assignor to Magnetic Manufacturing Company, Milwaukee, Wis., a corporation of Wisconsin Application April 14, 1930. Serial No. 444,323

11 Claims. (Cl. 198—41)

This invention relates to improvements in pipe conveyer rolls.

Peripherally grooved rolls have long been used for conveying pipe and it has long been known that the number of driving rolls could be reduced as compared with the number of idler rolls by rendering the driving rolls magnetic. The use of magnetic driving rolls, however, has not been as widespread as it might otherwise have been because of the expense of making repairs and replacements in driving rolls of designs heretofore known.

It is the primary object of the present invention to provide a novel and improved driving roll for use in iron pipe conveying mechanism, the roll being so designed that the annular peripheral flanges which engage the pipe for the propulsion thereof, may readily be removed, repaired or replaced individually or collectively without requiring the demounting of the pulley and without requiring extensive anchorage means.

Specifically, it is an object of this invention to provide a magnetic driving roll for pipe conveying systems, in which roll segmental pole flanges are provided in sections subdivided at different angular points upon the opposite sides of the roll and respectively interlocked with an undercut rib on the coil cover whereby only normal anchorage means is required at the outside faces of the roll for the detachable flanges thereof.

In the drawing.

Like parts are identified by the same reference characters throughout the several views.

The core 5 which comprises the body of the roll closely follows ordinary practice in magnetic driving rolls of this type. It is provided with a deep peripheral groove at 6 containing the winding 7 which is supplied with current in the usual way by means of a commutator which is not shown, but is housed within case 8. The shaft 9 upon which the roll is mounted and to which it is keyed, passes through the commutator case.

Figure 1:
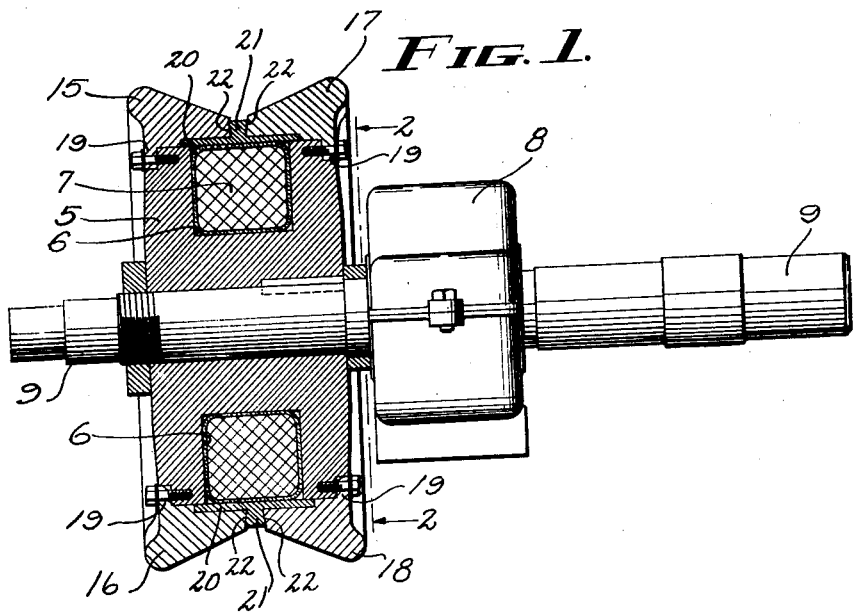
Figure 1 is an axial sectional view through a magnetic pipe driving roll embodying this invention.
Figure 2:
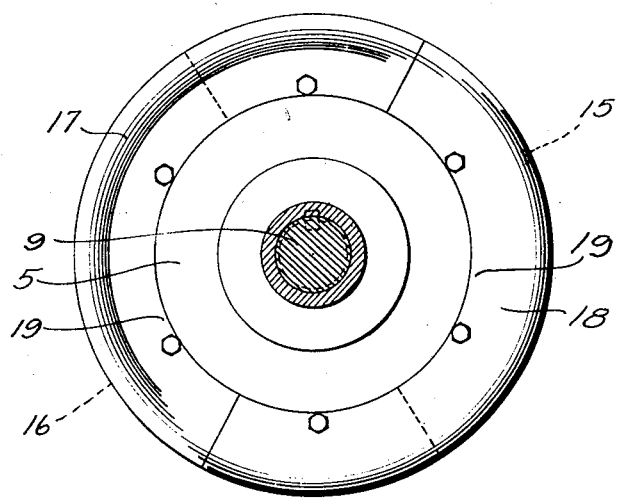
Figure 2 is an end elevation of the roll shown in Figure 1.

Instead of allowing the pipes to contact directly with the core 5 of the magnetic roll, I provide detachable tread segments 15, 16, 17 and 18. Each such segment has a centrally projecting flange 19 adjacent the exposed margin of its inner periphery and the several flanges are bolted to the shouldered outer faces of the core 5 as clearly shown in Figure 1.

Since none of the segmental tread members is more than 180 degrees in extent, it is very easily possible to remove any individual tread member, or all of the tread members, for repair or replacement without dismounting the roll or any of the bearings for the roll shaft. It is to be noted that the sectional tread construction does not interfere with the handling of pipe since the anchorage bolts are placed at the sides of the roll and the joints between sections are offset.

When the current is supplied to the winding 7 no mechanical means of anchoring the tread segments is necessary since they are firmly held in place by magnetic attraction. It may happen, however, that such a roll might be operated at relatively high speed at a time when current was cut off therefrom and in order to secure the heavy tread segments against the action of centrifugal force under such circumstances, it is preferred to supplement the action of the bolts above described by providing means which holds those portions of the tread segments which are near the central plane of the roll.

In order to anchor these inner margins of the tread segments, I provide the annular coil cover 20 with a central peripheral dove-tailed rib 21. The central faces 22 of the several tread segments are beveled to interlock beneath the undercut side margins of the rib 21 thereby securely anchoring the central margin of each tread segment against radial displacement. The rib 21 not only serves to perform this anchorage function but also acts as a positive spacing means for determining the proper distance between the segments.

When the anchorage bolts are tightened to force the segments against the rib 21 and against the shouldered outer faces of the core 5, the result is a positive interlock of the several segments with the coil cover 20, and thereby with each other, while, at the same time, the short circuiting of magnetic flux is prevented by the interposition of the coil cover rib 21, which, like the coil cover, is preferably made of brass or other non-magnetic metal. Such a roll has entirely adequate mechanical strength to withstand not only ordinary usage, but also abuse through operation without current. Its life is greatly prolonged by the arrangement which permits replacement of its tread and the practicability of a replaceable tread roll is enhanced by the ar-

I claim:

1. In a pipe conveyer roll, the combination of a core member having a peripheral winding, a plurality of polar thread segments, means adapted to independently secure said segments to said core member, and peripheral interlocking means restraining portions of said segments from radial displacement.

2. In a magnetic pipe conveyer roll, the combination of a core member provided with a peripheral winding, of polar treads anchored to said core member at its end faces and provided with centrally disposed interlocking means adapted to restrain central portions of said treads against radial displacement.

3. In a magnetic pipe conveyer roll, the combination of a core member provided with a peripheral winding, of polar treads anchored to said core member at its end faces and provided with centrally disposed interlocking means adapted to restrain central portions of said treads against radial displacement, said means comprising an undercut non-magnetic spacer member beneath the overhanging portions of which the margins of said treads extends.

4. A magnetic pipe conveyer roll comprising a core having a peripheral winding, an undercut annulus encircling said winding and a plurality of individually removable polar tread segments, means for connecting said segments with opposite end faces of said core and said segments having their inner margins respectively interlocked with said undercut annulus against radial displacement.

5. A magnetic pipe conveyer roll comprising a core having a peripheral winding, an undercut annulus encircling said winding and individually removable polar tread segments connected with opposite end faces of said core and having their inner margins respectively interlocked with said undercut annulus, said annulus comprising a ribbed non-magnetic coil cover for the winding on said core.

6. In a magnetic pipe conveyer roll, the combination with a core having marginally shouldered end faces and a central winding, of a cover band for said winding provided with an undercut annular rib and polar tread segments having flanges complementary to the shouldered portion of said core and individually connected therewith, the central margins of respective segments being interlocked with said undercut rib.

7. In a magnetic conveyer roll, the combination of a core member provided with a magnetic winding, a plurality of polar tread segments, means adapted to independently secure said segments to said core member, and peripherally disposed means operative to restrain segment portions against radial displacement and to axially locate said segments.

8. A magnetic conveyer roll comprising the combination of a core peripherally grooved to provide a winding slot, an energizing winding positioned within said slot, and a plurality of replaceable polar tread segments individually connected with each end of said core and projecting centrally across said winding slot to protect said winding and to receive the load and wear of articles conveyed by said roll, and means disposed on the periphery of said core spacing opposed margins of said segments and interlocking therewith to secure said segments against the radial displacement of their inner marginal portions.

9. In a pipe conveyer roll, the combination of a core member having a peripheral winding, polar tread segments independently secured to said core member and provided with opposed beveled sides, and inter-locking means coacting with said sides for restraining portions of said segments from radial displacement.

10. In a pipe conveyer roll, the combination of a core member having a peripheral winding, polar tread segments independently secured to said core member and provided with opposed inclined faces, and an annular cover for said winding, said cover having interlocking means engaging said faces to restrain portions of said segments from radial displacement.

11. A magnetic conveyer roll comprising a core having a peripheral groove to provide a winding slot, an energizing winding positioned within said slot, a plurality of polar tread segments individually connected with each end of said core and provided with opposed tapered sides, and an annular cover for said slot having interlocking means coacting with said sides for restraining portions of said segments from radial displacement.

ROSWELL H. STEARNS.